US011140805B2

(12) United States Patent
Engel et al.

(10) Patent No.: US 11,140,805 B2
(45) Date of Patent: Oct. 12, 2021

(54) INDEPENDENT GROUND ENGAGING TOOL DEPTH CONTROL

(71) Applicant: CNH Industrial Canada, Ltd., Saskatoon (CA)

(72) Inventors: Gordon Anthony Engel, Saskatoon (CA); Russell Altman, Saskatoon (CA); Trevor Kowalchuk, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 473 days.

(21) Appl. No.: 15/820,178

(22) Filed: Nov. 21, 2017

(65) Prior Publication Data

US 2019/0150350 A1 May 23, 2019

(51) Int. Cl.

| | |
|---|---|
| ***A01B 63/111*** | (2006.01) |
| ***A01B 63/00*** | (2006.01) |
| ***A01C 5/06*** | (2006.01) |
| ***A01B 49/02*** | (2006.01) |
| *A01B 49/06* | (2006.01) |

(52) U.S. Cl.

CPC ............ *A01B 63/008* (2013.01); *A01B 49/02* (2013.01); *A01B 63/1112* (2013.01); *A01C 5/062* (2013.01); *A01B 49/06* (2013.01)

(58) Field of Classification Search

CPC ....... A01C 7/203; A01C 5/062; A01B 63/008; A01B 49/02; A01B 63/1112

USPC ............................................................. 172/4

See application file for complete search history.

(56) References Cited

U.S. PATENT DOCUMENTS

| | | | | |
|---|---|---|---|---|
| 4,381,036 A * | 4/1983 | Fardal et al. | A01C 15/005 | 172/127 |
| 5,961,573 A * | 10/1999 | Hale | A01B 79/005 | 172/4.5 |
| 6,691,629 B2 * | 2/2004 | Paluch | A01B 61/044 | 111/200 |
| 8,201,637 B2 * | 6/2012 | Ripple | A01C 7/203 | 172/2 |
| 8,342,258 B2 | 1/2013 | Ryder et al. | | |
| 8,909,436 B2 * | 12/2014 | Achen | A01C 5/062 | 111/134 |
| 8,910,582 B2 | 12/2014 | Mariman et al. | | |
| 9,332,689 B2 | 5/2016 | Baurer et al. | | |
| 9,481,294 B2 | 11/2016 | Sauder et al. | | |
| 9,554,504 B2 | 1/2017 | Houck | | |
| 9,629,304 B2 | 4/2017 | Zielke | | |

(Continued)

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

In one embodiment, a seeding implement control system includes a controller including a memory and a processor. The controller is configured to receive a first signal indicative of a target extension length of an actuator. The actuator is configured to control a ground engaging tool of a row unit. The actuator is also configured to position a lower surface of a blade of the ground engaging tool a target distance above a soil surface while the actuator is extended to the target extension length. The controller is further configured to store the target extension length in a memory device of the controller. The controller is configured to instruct the actuator to transition to the target extension length in response to receiving a second signal indicative of transitioning the ground engaging tool to a disengaged position.

8 Claims, 5 Drawing Sheets

(56) References Cited

U.S. PATENT DOCUMENTS

| | | | | |
|---|---|---|---|---|
| 9,674,999 | B2 | 6/2017 | Achen et al. | |
| 2014/0000919 | A1 | 1/2014 | Bachman et al. | |
| 2016/0037709 | A1 | 2/2016 | Bauder et al. | |
| 2016/0316614 | A1 | 11/2016 | Burk et al. | |
| 2016/0338260 | A1 | 11/2016 | Hahn et al. | |
| 2017/0000020 | A1* | 1/2017 | Maniar | A01C 7/088 |
| 2017/0006757 | A1* | 1/2017 | Anderson | A01C 7/203 |
| 2017/0215334 | A1* | 8/2017 | Dienst | A01C 5/064 |
| 2017/0339819 | A1* | 11/2017 | Kowalchuk | A01B 49/027 |

* cited by examiner

SEEDING IMPLEMENT CONTROL SYSTEM
CONTROLLER
P
M
80
82
84
86
18
20
22
24
25
26
27
28
30
31
32
34
35
36
37
39
40
41
42
43
44
46
58
60
62
76
0
1
2
3
4

SEEDING IMPLEMENT CONTROL SYSTEM
CONTROLLER
P
M

INDEPENDENT GROUND ENGAGING TOOL DEPTH CONTROL

BACKGROUND

The present disclosure relates to independently controlling the depth of ground engaging tools.

Generally, a seeding implement may be towed behind a work vehicle (e.g., a tractor) via a mounting bracket secured to a rigid frame of the seeding implement. The seeding implement typically includes multiple row units, each having at least one ground engaging tool. Each ground engaging tool typically includes a shank that is movably coupled to a frame of the seeding implement. A blade is disposed on an end of the shank, and the blade is configured to break the soil as the seeding implement traverses a field to form a seeding path for seed deposition. Typical seeding implements include a biasing device (e.g., a hydraulic cylinder), which applies a force to the ground engaging tool while the blade engages (e.g., breaks) the soil. The biasing device urges the ground engaging tool into the soil while the seeding implement traverses the field, thus substantially maintaining the position of the blade within the soil. Seeds are typically deposited by a seed tube positioned proximate to the blade. The blade is followed by a packer wheel that packs the soil on top of the deposited seed. The packer wheel also serves to adjust a penetration depth of the blade within the soil. For example, the penetration depth of the blade is adjustable by varying a vertical position of the packer wheel relative to the blade. In typical seeding implements, the packer wheel is pivotally coupled to a packer arm, and the packer arm is pivotally coupled to a packer support structure. Rotation of the packer arm relative to the packer support structure thus varies a vertical distance between the packer wheel and the blade.

Typical seeding implements deposit multiple rows of seed within the soil. The seed tube of each row unit directs seed from a storage compartment toward the respective seeding path of each row unit. In some cases, seed flow to the seed tubes of certain row units is blocked, such that the respective row units do not deposit seed into the soil. For example, the seeding implement may only deposit seed via row units of a left half of the seeding implement. In typical seeding implements, the blades of disabled row units (e.g., row units that are not depositing seed) remain disposed within the soil while the seeding implement traverses the field. Consequently, the blades of disabled row units may disturb adjacent seeded row(s) within the field during seeding operations.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In one embodiment, a seeding implement control system includes a controller including a memory and a processor. The controller is configured to receive a first signal indicative of a target extension length of an actuator. The actuator is configured to control a ground engaging tool of a row unit. The actuator is also configured to position a lower surface of a blade of the ground engaging tool a target distance above a soil surface while the actuator is extended to the target extension length. The controller is further configured to store the target extension length in a memory device of the controller. The controller is configured to instruct the actuator to transition to the target extension length in response to receiving a second signal indicative of transitioning the ground engaging tool to a disengaged position.

In one embodiment, a seeding implement includes a controller that includes a memory and a processor. The seeding implement also includes an actuator that is coupled to the seeding implement. The actuator is configured to control a ground engaging tool of the row unit. The actuator is also configured to position a lower surface of a blade of the ground engaging tool a target distance above a soil surface while the actuator is extended to a target extension length. The controller is further configured to receive a first signal indicative of the target extension length of the actuator, store the target extension length in a memory device of the controller, and instruct the actuator to transition to the target extension length in response to receiving a second signal indicative of transitioning the ground engaging tool to a disengaged position.

In one embodiment, a method for controlling an actuator of a row unit of an agricultural implement includes receiving a first signal indicative of a target extension length of the actuator via a controller. The actuator is configured to control a ground engaging tool of the row unit. The actuator is also configured to position a lower surface of a blade of the ground engaging tool a target distance above a soil surface while the actuator is extended to the target extension length. The method also includes storing the target extension length in a memory device of the controller. The method further includes instructing the actuator to transition to the target extension length in response to receiving a second signal indicative of transitioning the ground engaging tool to a disengaged position.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The present disclosure relates to a seeding implement control system configured to move a ground engaging tool of a seeding implement between an engaged position (e.g., a position in which the ground engaging tool breaks the soil)

and a disengaged position (e.g., a position in which the ground engaging tool does not disturb the soil). The seeding implement control system may be configured to individually control the position of each ground engaging tool of the seeding implement. The disengaged position of each ground engaging tool may be calibrated and stored in the seeding implement control system. The seeding implement control system may thus move the ground engaging tool to the stored disengaged position during various operational conditions of the seeding implement. For example, during seeding operations, certain row units of the seeding implement may be disabled (e.g., do not deposit seed into the soil. The seeding implement control system may be configured to retract the ground engaging tools of the disabled row units from the soil, such that the ground engaging tools of these row units do not engage the soil and, thus, do not disturb adjacent seeded rows.

For example, in certain embodiments, a row unit of the seeding implement includes a packer arm pivotally coupled to a packer support structure, and the ground engaging tool includes a blade. The row unit also includes a packer wheel rotatably coupled to the packer arm. The packer wheel is configured to rotate across a soil surface to control a position of the blade relative to the surface of the soil. For example, the packer wheel may limit a penetration depth of the blade within the soil and facilitate adjustment of a height of the blade above the soil surface. The row unit further includes an actuator having a first portion rotatably coupled to the packer arm and a second portion rotatably coupled to the packer support structure. In certain embodiments, the position of the blade relative to the surface of the soil is controlled by extending and retracting the actuator. The seeding implement control system includes a controller that is configured to store a position of the actuator that corresponds to the disengaged position of the ground engaging tool. The controller may send a signal to the actuator that instructs the actuator to move the ground engaging tool to the disengaged position while the ground engaging tool is disabled (e.g., while the ground engaging tool does not deposit seed). Because the actuator may move the ground engaging tool to the disengaged position when instructed by the controller, the seeding implement control system may individually control the engagement of ground engaging tools of individual row units, such that the blades of row units that are deposing seed are disposed below the soil surface and the blades of row units that are not depositing seed are disposed in the disengaged position (e.g., do not disturb the soil).

Figure 1:
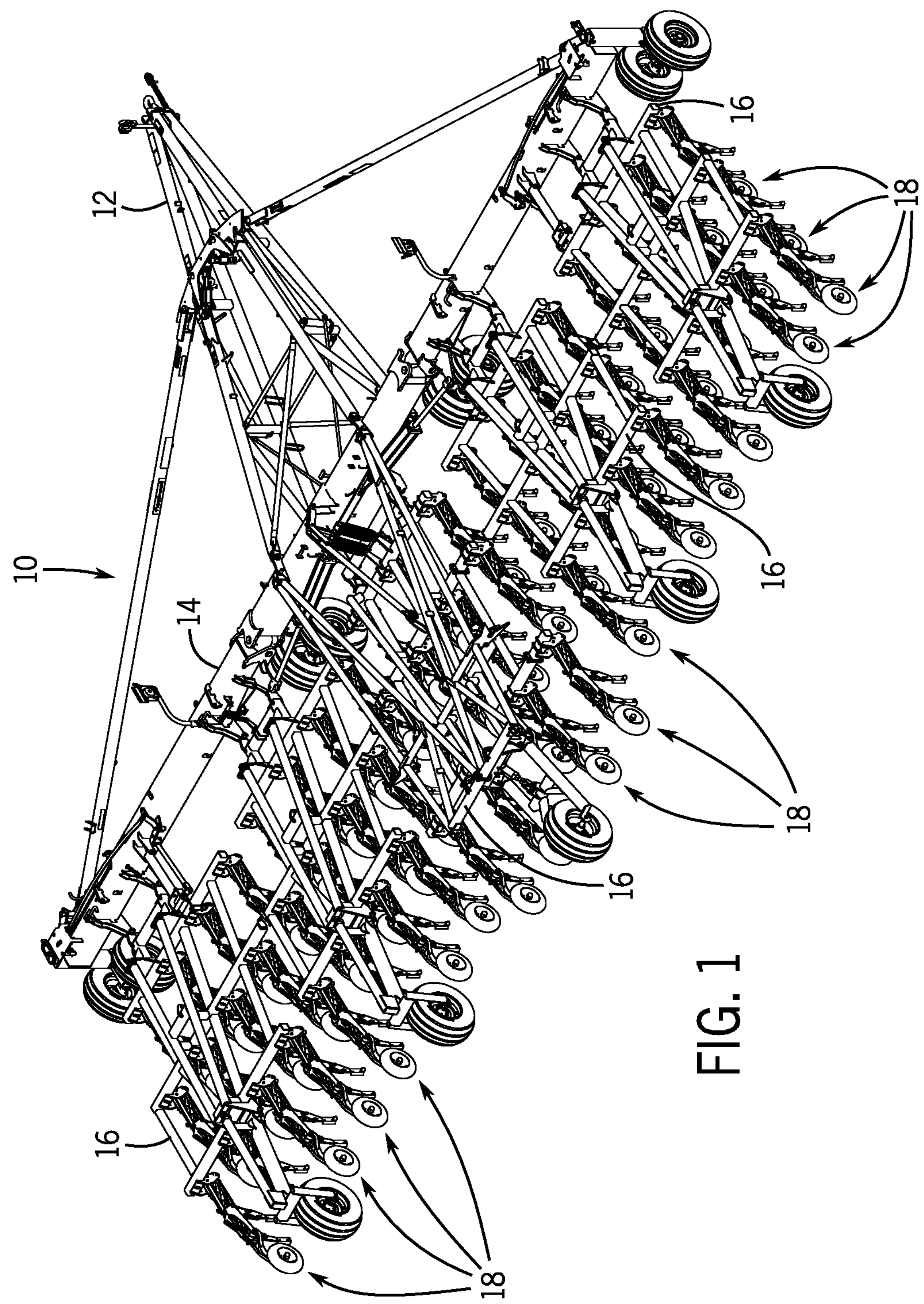
FIG. 1 is a perspective view of a seeding implement including multiple row units, in accordance with an embodiment of the present disclosure.

Turning now to the drawings, FIG. 1 is a perspective view of a seeding implement 10, in accordance with an embodiment of the present disclosure. The seeding implement 10 is configured to be towed behind a work vehicle, such as a tractor. The seeding implement 10 includes a tow bar assembly 12, which is shown in the form of an A-frame hitch assembly. The tow bar assembly 12 may include a hitch used to attach to an appropriate tractor hitch via a ball, clevis, or other coupling. The tow bar assembly 12 is coupled to a tool bar 14 which supports multiple tool frames 16. Each tool frame 16 includes multiple row units 18 that are configured to deposit seed into the soil.

Figure 2:
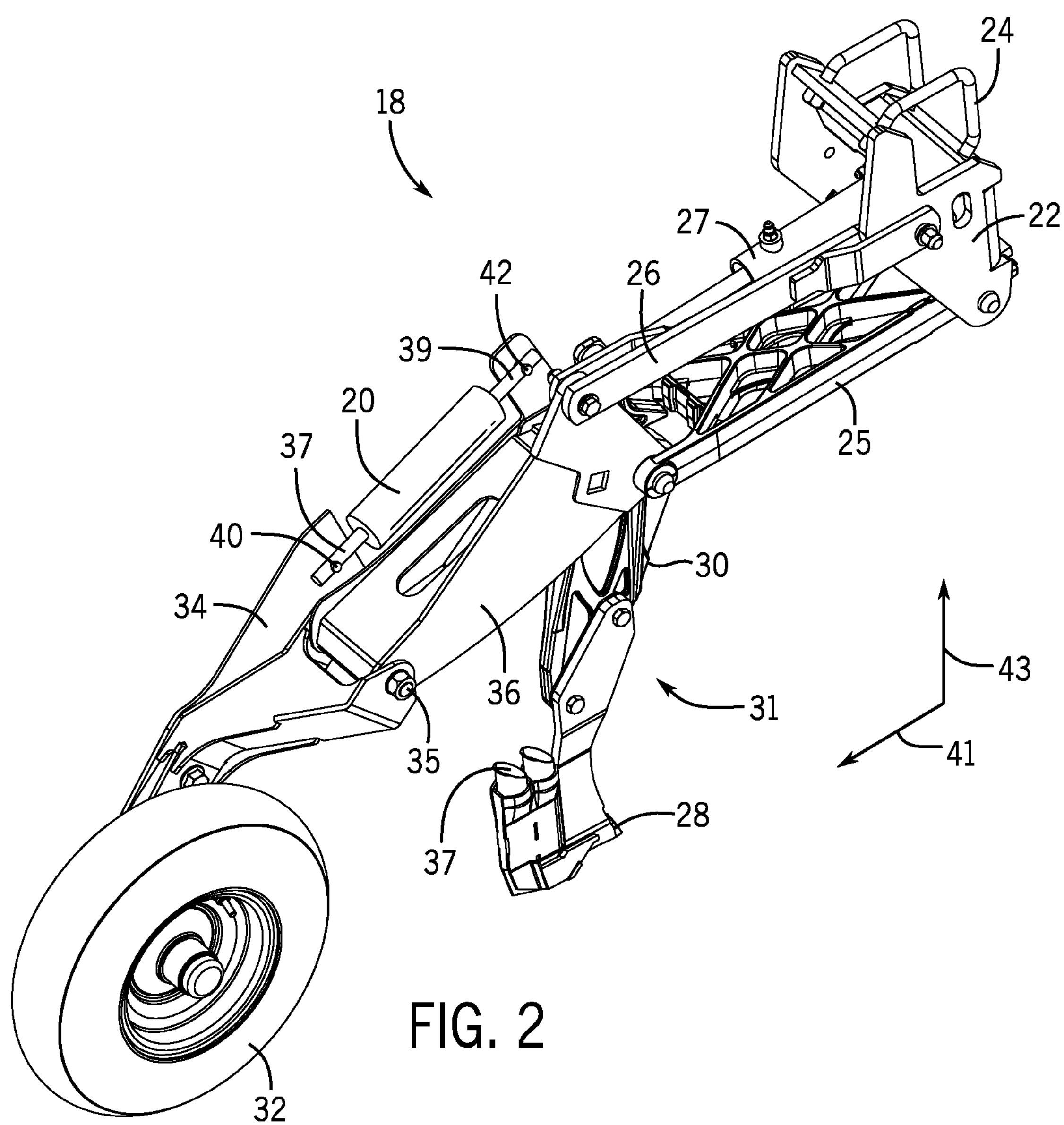
FIG. 2 is a perspective view of a row unit including a ground engaging tool that may be used on the seeding implement of FIG. 1, in accordance with an embodiment of the present disclosure.

FIG. 2 is a perspective view of a row unit 18 that may be used on the seeding implement of FIG. 1, in accordance with an embodiment of the present disclosure. In the illustrated embodiment, the row unit 18 includes a powered actuator 20 configured to adjust a position of a blade 28 of the row unit 18 relative to the surface of the soil. The row unit 18 also includes a frame support 22 and mounting brackets 24, which are configured to interface with a respective tool frame, thereby securing the row unit 18 to the respective tool frame. For instance, multiple row units 18 may be mounted in parallel along the respective tool frame 16 to form a seeding unit. In the present configuration, the frame support 22, a first member 25, and a second member 26 form elements of a parallel linkage (e.g., a four-bar linkage). The parallel linkage is configured to direct movement of the blade 28 substantially along a vertical axis 43 and, accordingly, enables the angle of the blade 28 relative to the soil to be substantially maintained throughout the vertical range of motion of the blade 28. In some embodiments, the parallel linkage may thus direct the blade 28 substantially not along a longitudinal axis 41. While the illustrated embodiment includes a parallel linkage, in alternative embodiments, the frame support, the first member, and the second member may form another suitable type of linkage. Components of the row unit 18, such as the frame support 22, the mounting brackets 24, the first member 25, and the second member 26 may be formed from any suitable material, such as steel.

The row unit 18 includes a biasing device, such as the illustrated cylinder 27 (e.g., hydraulic or pneumatic piston-cylinder assembly). The cylinder 27 may be hydraulically coupled to a supply that provides a flow of pressurized hydraulic fluid which displaces a piston rod extending from the cylinder 27. The cylinder 27 is attached to a shank 30 of a ground engaging tool 31 via a pin at the end of the piston rod. A blade 28 of the ground engaging tool 31 extends from the shank 30 and is configured to engage the soil. A contact force between the blade 28 of the ground engaging tool 31 and the soil establishes a moment about a shank pivot joint. This moment is resisted by force applied to the shank 30 by the cylinder 27. Furthermore, the cylinder 27 may be configured to enable the blade 28 to maintain a desired vertical position relative to the soil surface by applying a force to the linkage. As illustrated, the linkage is coupled to a packer support structure 36. As discussed in greater detail herein, the blade 28 may be disposed below the soil surface and configured to break the soil while the ground engaging tool 31 is in an engaged position. In addition, the blade 28 may be disposed above the soil surface, such that the blade 28 does not disturb the soil, while the ground engaging tool 31 is in a disengaged position. For example, the powered actuator 20 may be used to move a packer wheel 32 along the vertical axis 43, which urges the ground engaging tool 31 to move between the engaged position and the disengaged position.

The frame support 22 is coupled to the packer support structure 36 via the first member 25 and the second member 26. The packer support structure 36 is coupled to the shank 30 of the ground engaging tool 31, and the blade 28 extends from the shank 30. The packer support structure 36 is pivotally coupled to a packer arm 34 that is pivotally coupled to the packer wheel 32. Seeds may be deposited into the soil via seed tube(s) 37 positioned proximate to the blade 28. While the ground engaging tool 31 is in the engaged position, the blade 28 is disposed below the surface of the soil and breaks the soil to enable seed and/or fertilizer deposition. The blade 28 is followed by the packer wheel 32 that packs the soil on top of the deposited seed/fertilizer. In certain configurations, the packer wheel 32 serves to adjust a position of the blade 28 relative to the soil surface. As described in greater detail herein, the position of the blade 28 is adjustable by varying a vertical position of the packer wheel 32 relative to the blade 28.

The packer arm 34, which supports the packer wheel 32, is pivotally coupled to the packer support structure 36. A pivot 35 (e.g., a pin, bolt, or the like) disposed through openings within the packer arm 34 and the packer support structure 36 enables rotation of the packer arm 34 with respect to the packer support structure 36. Rotation of the packer arm 34 relative to the packer support structure 36 is controlled by the actuator 20. A first portion or end 37 of the actuator 20 is rotatably coupled to the packer arm 34 via a first rotatable fastener 40, and a second portion or end 39 of the powered actuator 20 is rotatably coupled to the packer support structure 36 via a second rotatable fastener 42. The first and second rotatable fasteners 40, 42 may include pins, bolts, rings, clips, and the like.

In the illustrated embodiment, the actuator 20 is a linear actuator, in which the actuator extends and retracts along a substantially straight line. The actuator 20 may be any suitable type of actuator, such as an electrical actuator (e.g. a linear actuator, a piezoelectric actuator, an electromechanical actuator, etc.), a hydraulic actuator, a pneumatic actuator, and the like. The electric actuator may be inexpensive and include self-lock features that enable the position of the packer arm 34 to be maintained. For example, when the electrical actuator is used to set the blade 28 at a desired position above or beneath the soil surface, the electrical actuator may stop or lock itself in the respective position when power is no longer supplied to the electrical actuator.

Figure 3:
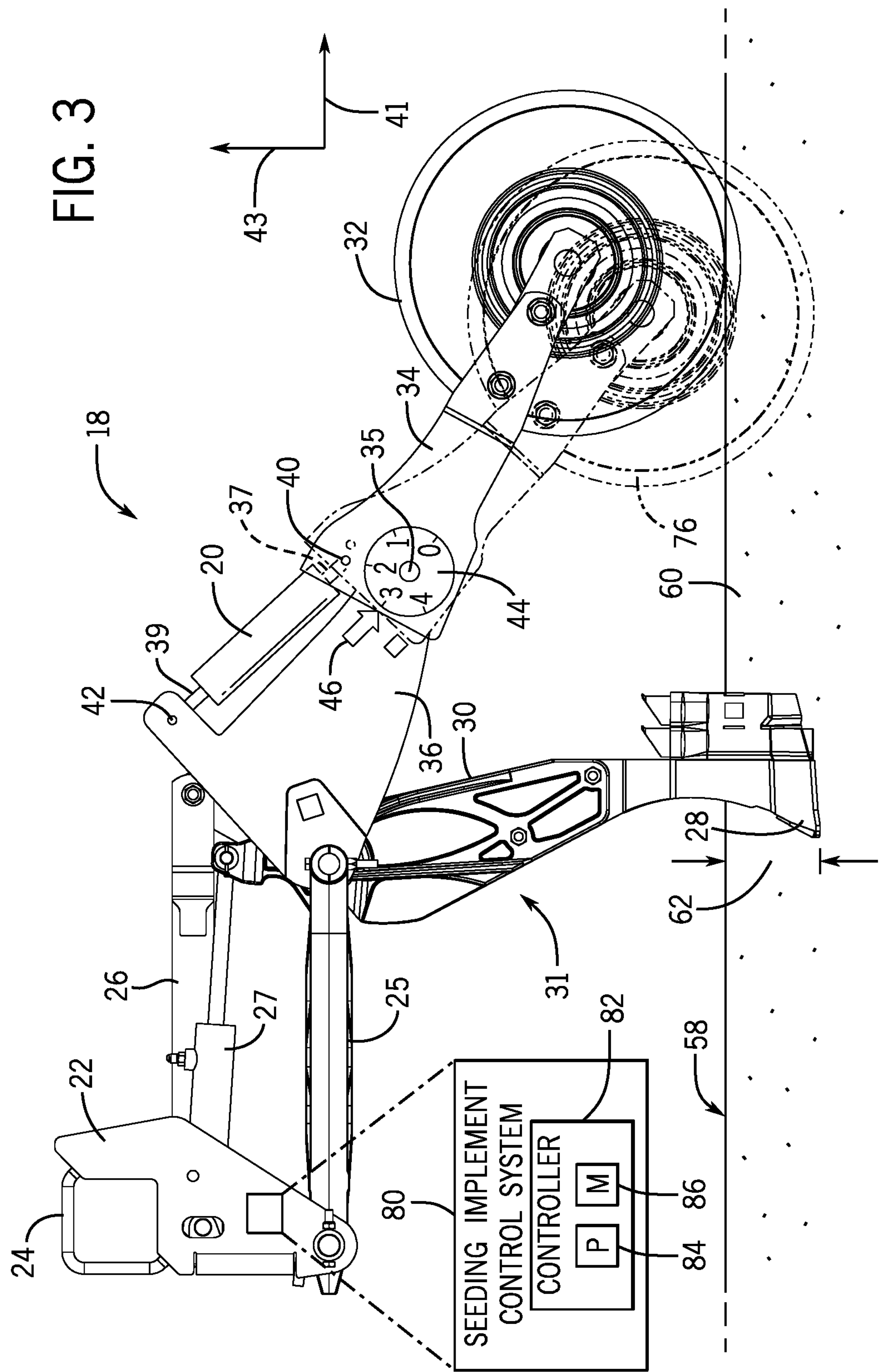
FIG. 3 is a side view of the row unit of FIG. 2, in which the ground engaging tool is in an engaged position, in accordance with an embodiment of the present disclosure.

FIG. 3 is a side view of the row unit 18 of FIG. 2, in which the ground engaging tool 31 is in the engaged position, in accordance with an embodiment of the present disclosure. As discussed above, the first end 37 of the actuator 20 is rotatably coupled to the packer arm 34 via the first rotatable fastener 40, and the second end 39 of the powered actuator 20 is rotatably coupled to the packer support structure 36 via the second rotatable fastener 42. Retracting the actuator 20 rotates the packer arm 34 upwardly (e.g., along the vertical axis 43) relative to the packer support structure 36, such that the packer wheel 32 moves vertically upward (e.g., along the vertical axis 43) relative to a position of the blade 28. Extending the actuator 20 rotates the packer arm 34 downwardly (e.g., along the vertical axis 43) relative to the packer support structure 36, such that the packer wheel 32 moves vertically downward relative to a position of the blade 28.

Because the packer wheel 32 is configured to rotate across a surface 58 of the soil 60, varying a vertical position of the packer wheel 32 relative to the blade 28 varies the a vertical position of the ground engaging tool 31 relative to the soil surface 58 of the soil 60. The actuator 20 may thus move the ground engaging tool 31 to the engaged position, the disengaged position, or any position there between. The blade 28 of the ground engaging tool 31 is disposed below the surface 58 of the soil 60 while the ground engaging tool 31 is in the engaged position (e.g., while the seeding implement is depositing seed and/or fertilizer within the soil 60). Thus, while the ground engaging tool 31 is in the engaged position, the actuator 20 may adjust a penetration depth 62 of the blade 28 within the soil 60. The penetration depth 62 may be selected based on soil conditions, type of seeds, or environmental factors, among other considerations.

In the illustrated embodiment, the row unit 18 includes a depth indicator 44 that indicates the penetration depth 62 of the blade 28 into the soil 60. The depth indicator 44 may be any suitable device that indicates the penetration depth 62 of the blade 28, such as a dial, a strip or tape that includes depth marks, and the like. As illustrated, the depth indicator 44 is a dial that includes numbers indicating the penetration depth 62 of the blade 28. An arrow 46 of the packer support structure 36 points to a position on the depth indicator 44, which is on the packer arm 34. The depth indicator 44 may enable the blade 28 to be accurately set at a target penetration depth into the soil 60.

In some embodiments, the flow of seed/fertilizer to the seed tube(s) 37 of certain row units 18 may be selectively disabled, such that seed is not deposited into the soil 60 by the respective row units 18. For example, an operator (e.g., a tractor operator) may terminate the flow of seed/fertilizer to the row units 18 when turning the work vehicle (e.g., the tractor) and the seeding implement at a headland of a field between successive seeding paths. Additionally or otherwise, the operator may adjust the number of seeded rows that are generated by the row units 18. For example, the operator may select that only row units 18 of a left half of the seeding implement deposit seed within the soil 60. As described in greater detail herein, the operator may utilize a seeding implement control system 80 to send a signal to certain actuators 20 to move respective ground engaging tools 31 of disabled row units 18 to the disengaged position, such that the blades 28 of these disengaged ground engaging tools 31 do not disturb seeded rows in the soil 60. The dashed lines represent a downward position 76 of the packer arm 34, which corresponds to the disengaged position of the ground engaging tool 31 (as shown in greater detail in FIG. 4). Thus, the blade 28 may be moved to a position above (e.g., substantially near) the surface 58 of the soil 60. Although the seeding implement control system 80 is coupled the frame support 22 in the illustrated embodiment, in alternative embodiments, the seeding implement control system 80 may couple to any suitable portion of the seeding implement. In some embodiments, the seeding implement control system 80 may be disposed remotely from the seeding implement, such as in a cab of the work vehicle (e.g., a tractor cab) towing the seeding implement.

The actuators 20 may be controlled (e.g., from a location remote from the row unit 18) using the seeding implement control system 80. One or more control signal transfer devices, such as wires, cables, wireless communication devices, and the like, may communicatively couple the actuators 20 to a controller 82 (or a plurality of controllers 82) of the seeding implement control system 80. The controller 82 includes a processor 84 (e.g., a microprocessor) that may execute software, such as software for controlling the row unit 18. Moreover, the processor 84 may include multiple microprocessors, one or more "general-purpose" microprocessors, one or more special-purpose microprocessors, and/or one or more application specific integrated circuits (ASICS), or some combination thereof. For example, the processor 84 may include one or more reduced instruction set (RISC) processors.

The controller 80 also includes a memory device 86 that may store information such as control software, look up tables, configuration data, etc. The memory device 86 may include a volatile memory, such as random access memory (RAM), and/or a nonvolatile memory, such as read-only memory (ROM). The memory device 86 may store a variety of information and may be used for various purposes. For example, the memory device 86 may store processor-executable instructions (e.g., firmware or software) for the processor 84 execute, such as instructions for controlling the row unit 18. In some embodiments, the memory device 86 is a tangible, non-transitory, machine-readable-medium that may store machine-readable instructions for the processor 84 to execute. The memory device 86 may include ROM, flash memory, a hard drive, or any other suitable optical, magnetic, or solid-state storage medium, or a combination thereof. The memory device 86 may store data, instructions, and any other suitable data. As discussed in greater detail herein, the memory device 86 may store an extension length of each powered actuator 20 that is indicative of the disengaged position of respective ground engaging tools 31.

In some embodiments, the seeding implement control system 80 may include multiple controllers 82. The controllers 82 may be mounted at any suitable location (e.g., on the implement and/or remote from the implement). For example, a controller 82 may be coupled to each row unit 18 of the seeding implement. Each controller 82 may control one or more actuators 20 of one or more respective row units 18. For example, certain controllers 82 may control respective sets of row units 18, such that the actuators 20 of each row unit set may be controlled by a single controller 82. In some embodiments, a single controller 82 may control all row units 18 of the seeding implement, and may individually control each actuator 20. The controller(s) 82 may be mounted in a suitable location (e.g., on the seeding implement). For example, the controller(s) 82 may be mounted on the tool bar or the tool frame of the seeding implement. In some embodiments, the controller(s) 82 may be located on the work vehicle (e.g., in the cab of the tractor towing the seeding implement).

Figure 4:
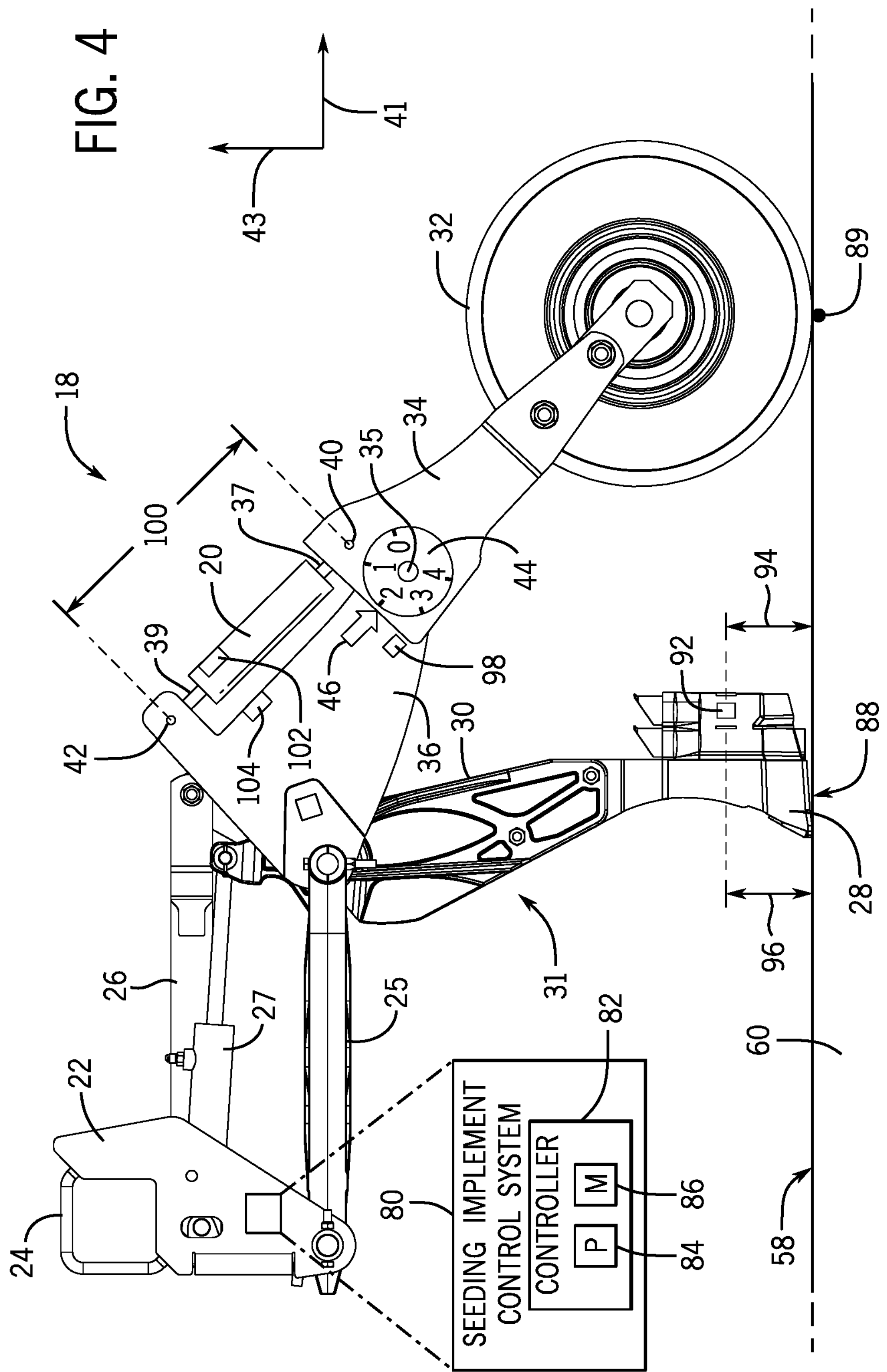
FIG. 4 is a side view of the row unit of FIG. 2, in which the ground engaging tool in is a disengaged position, in accordance with an embodiment of the present disclosure.

FIG. 4 is a side view of the row unit 18 of FIG. 2, in which the ground engaging tool 31 is in the disengaged position, in accordance with an embodiment of the present disclosure. As discussed above, the ground engaging tool 31 may not disturb the soil 60 when in the disengaged position. For example, the ground engaging tool 31 may be positioned such that a vertical distance between the surface 58 of the soil 60 and a lower surface 88 of the blade 28 is substantially large (e.g., greater than 10 centimeters). In some embodiments, the ground engaging tool 31 may be positioned such that a vertical distance between the surface 58 of the soil 60 and the lower surface 88 of the blade 28 is substantially small (e.g., less that 2 centimeters). In other embodiments, the vertical distance between the surface 58 of the soil 60 and the lower surface 88 of the blade 28 may substantially zero (e.g., ±1 centimeters, ±0.5 centimeters). In some embodiments, the ground engaging tool 31 may be enabled to rapidly reconfigure between the engaged position and the disengaged position when the vertical distance is substantially zero. In any case, while the ground engaging tool 31 is in the disengaged position, disturbance to the soil 60 by the ground engaging tool 31 is substantially reduced or eliminated.

The operator may use an input device (e.g., a screen, knobs, dials) to instruct the seeding implement control system 80 to move the ground engaging tool 31 to the disengaged position. For example, the operator may instruct the ground engaging tool 31 to move to the disengaged position while the operator turns around in the headland of the field to complete a successive seeding path. Additionally or otherwise, the seeding implement control system 80 may automatically move the ground engaging tool 31 to the disengaged position based on a field plan and a position of the seeding implement. The field plan may include predetermined instructions in which an operator (e.g., the tractor operator) has identified which portion of the field should receive seed and/or fertilizer. For example, the operator may configure the field plan such that the seeding implement is instructed to stop seed deposition within the soil 60 while the seeding implement is disposed on the headland of the field. Accordingly, the seeding implement control system 80 may move the ground engaging tools 31 to the disengaged position while the seeding implement traverses a portion of the field that should not receive seed and/or fertilizer.

In any case, the seeding implement control system 80 may send a signal (e.g., via the controller 82) to the actuator 20 to instruct the actuator to extend linearly, thus rotating the packer arm 34 downwardly (e.g., along the vertical axis 43) relative to the packer support structure 36. Downward rotation of the packer arm 34 (e.g., due to an extension of the actuator 20) may move the lower surface 88 of the blade 28 vertically upward relative to a ground contact point 89 of the packer wheel 32. For example, because the packer wheel 32 is configured to rotate on the surface 58 of the soil 60, the blade 28 may be positioned to substantially reduce or eliminate soil disturbance while the vertical position of the ground contact point 89 is substantially equal to or lower than the vertical position of the lower surface 88 of the blade 28. As described in greater detail herein, the seeding implement control system 80 may be calibrated such the disengaged position of the ground engaging tool 31 may be determined and stored (e.g., within the memory 86). For example, an extension length 100 of the actuator 20 corresponding to the disengaged position of each ground engaging tool 31 may be stored within the memory 86.

In some embodiments, the seeding implement control system 80 may actively monitor the position of the ground engaging tool 31 to determine whether the ground engaging tool 31 is in a target position (e.g., to determine whether the ground engaging tool 31 is in the disengaged position while seed is not provided to the respective row unit 18). For example, each row unit 18 may include a sensor 92 (e.g., a proximity sensor) that outputs a signal indicative of a measured distance 94 between the sensor 92 and the surface 58 of the soil 60. The sensor 92 is communicatively coupled to the controller 82, and the controller 82 is configured to determine the vertical position of the lower surface 88 of the blade 28 relative to the surface 58 of the soil 60 based on the signal from the sensor 92. For example, the sensor 92 may be coupled to the ground engaging tool 31 at a distance 96 from the lower surface 88 of the blade 28. The distance 96 may be stored by the controller 82 (e.g., in the memory device 86). The vertical distance between the lower surface 88 of the blade 28 and the surface 58 of the soil 60 may thus be determined based on the measured distance 94 between the sensor 92 and the surface 58 of the soil 60 and the sensor position distance 96. The controller 82 may monitor the measured distance 94 during operation of the seeding implement, and determine whether the position of the blade 28 is within a threshold distance from a target blade position (e.g., associated with the engaged position of the ground engaging tool or the disengaged position of the ground engaging tool). The controller 82 may send a signal to the actuator 20 to instruct the actuator 20 to adjust the extension length 100 if the difference between the measured blade position and the target blade position is outside of the threshold distance (e.g., if the blade position is above or below the target blade position by more than the threshold distance).

The controller 82 may output another signal indicative to the blade position to an output device (e.g., a display) to enable the operator to monitor the position of the blade 28 (e.g., the position of each blade of the implement) relative to the surface 58 of the soil 60. The output device (e.g., a touch screen display) may be located within the cab of the work vehicle and configured to receive inputs (e.g., to control one or more actuators 20) and to display output information (e.g., the position of the respective blades 28/ground engaging tools 31).

In some embodiments, the operator may control each actuator 20 via the seeding implement control system 80 such that the respective blade 28 engages the soil 60 at a respective target depth (e.g., while the respective ground engaging tool is in the engaged position) or is positioned a target distance above the surface 58 of the soil 60 (e.g., while the respective ground engaging tool is in the disengaged position). For example, the operator may instruct (e.g., via the input device of the seeding implement control system 80) the ground engaging tool(s) 31 of one or more row units 18 of the seeding implement to move to the disengaged position. After receiving a signal indicative of the target position of the ground engaging tool(s) 31, the controller 82 may instruct one or more respective actuators 20 of the respective row units 18 to move the ground engaging tool(s) 31 to the disengaged position.

In some embodiments, the controller 86 may be configured to automatically move the ground engaging tool(s) 31 to the disengaged position while seed is not directed to certain ground engaging tool(s) 31. For example, the field plan may instruct the seeding implement to block seed flow to certain row units 18 while the seeding implement traverses a portion of the field (e.g., the headland of the field). As such, the controller 86 may be configured move certain ground engaging tools 31 to the disengaged position while the respective row units 18 are not depositing seed within the soil 60. In some embodiments, the operator (e.g., the tractor operator) may selectively terminate the flow of seed/fertilizer to certain row units 18 (e.g., when turning the work vehicle around in the headland of a field). Similarly, the controller 82 may automatically move the row units 18 to the disengaged position while these row units 18 are disabled from depositing seed.

When the ground engaging tool is in the engaged position, the row unit 18 may output a signal indicative of the penetration depth of the blade 28 into the soil 60 and/or a position of the packer arm 34 (e.g., relative to the packer support structure 36) via the one or more control transfer devices that communicatively couple the powered actuator 20 to the controller 86. For example, the controller 86 may receive the signal from the sensor 92 of each row unit 18 indicative of the depth of the blade 28 in the soil. In some embodiments, the controller 86 may determine the depth of the blade 28 within the soil by receiving a signal indicative of the position of the packer arm 34 from an additional sensor 98. The controller 86 may output another signal based at least in part on the signal from the sensors 92 and/or 98 to an output device (e.g., the display). The operator may control each powered actuator 20 via the controller 86, such that the respective blade 28 engages the soil 60 at a target depth (e.g., a penetration depth below the surface 58 of the soil 60). In some embodiments, the operator may input the target depth for one or more of the blades 28 of one or more row units 18 of the seeding implement. After receiving a signal indicative of the target depth, the controller 86 or a controller of the seeding implement may then instruct certain powered actuators 20 of the respective row units 18 to engage the soil 60 at the target depth. The output device may be located next to the input device that controls the powered actuator 20, or in some embodiments, be part of the same device as the input device, such that the same device accepts inputs (e.g., to control one or more powered actuators 20) and displays output information (e.g., the depth of the respective blade(s) 28. In some embodiments, the controller 86 may monitor (e.g., via the sensor 92) a measured depth of the each blade 28 within the soil 60, such that the controller 86 may adjust the extension length 100 of the actuator 20 if the measured depth deviates from the target depth by a threshold value.

As discussed above, the seeding implement control system 80 may be calibrated before operation of the seeding implement to determine the disengaged position of each of the ground engaging tools 31. As described in greater detail herein, the extension length 100 of the actuator 20 corresponding to the disengaged position of each ground engaging tool 31 may be different or the same. In some embodiments, while the ground engaging tools are in the disengaged position, the target position of the blades 28 relative to the surface 58 of the soil 60 may be substantially zero. In such embodiments, before beginning agricultural operations, each actuator 20 may be manually adjusted (e.g., via the operator) such that the vertical distance between the lower surface 88 of the blade 28 and the surface 58 of the soil 60 is substantially zero (e.g., ±1 centimeters, ±0.5 centimeters). In some embodiments, the target position of each blade 28 relative to the surface 58 of the soil 60 may be substantially above the surface 58 of the soil 60. For example, the vertical distance between the surface 58 of the soil 60 and the lower surface 88 of the blade 28 may be 5 centimeters, 10 centimeters, or more, when the ground engaging tool 31 is the in the disengaged position. In such embodiments, the operator may set the vertical distance of each ground engaging tool 31 to the target position. Accordingly, the seeding implement control system 80 may be calibrated manually via the operator. For example, the operator may manually adjust each actuator 20 such that the ground engaging tool 31 corresponding to each actuator 20 is positioned at the target position. As such, the operator may set the disengaged position of each ground engaging tool 31.

In some embodiments, the controller may adjust each actuator 20 such that the ground engaging tool 31 of the corresponding actuator 20 is in the target position. For example, the operator may instruct the controller 82 (e.g., via the input device) to position the lower surface 88 of the blade 28 at a certain vertical distance above the surface 58 of the soil 60. As discussed above, the controller 82 may use the sensor 92 to position the ground engaging tool 31 at the desired vertical distance, such that the controller 86 may set the disengaged position of the ground engaging tool 31. In any case, the controller 86 may store the extension length 100 of the actuator 20 that is indicative of the disengaged position of each ground engaging tool 31.

In some embodiments, the actuator 20 may include an integrated sensor 102 configured to send a signal indicative of the extension length 100 of the actuator 20 to the controller 82. In other embodiments, the seeding implement control system 80 may include an external sensor 104 (e.g., a sensor coupled to the packer support structure 36), which is configured to measure the extension length 100 of the actuator 20. The controller 86 may store the extension length 100 of the actuator 20 which corresponds to the disengaged position of the ground engaging tool 31. As such, the controller 82 may store the extension length 100 of each powered actuator 20 of the ground engaging tool, such that the disengaged position of each ground engaging tool 31 may be stored in the memory 86.

In some embodiments, the target position of certain blades 28 relative to the surface 58 of the soil 60 may be different while the respective ground engaging tools 31 are in the disengaged position. For example, certain row units 18 may be disposed behind wheels of the work vehicle (e.g., the tractor). When the work vehicle traverses a field, the weight of the work vehicle may cause the wheels of the work vehicle to compress the soil 60 beneath the wheels, thus leaving indentations (e.g., tracks) in the surface 58 of the soil 60. For example, in an embodiment where the target position of the blade 28 is substantially zero (e.g., ±1 centimeters, ±0.5 centimeters relative to the surface 58 of the soil 60), the disengaged position of the ground engaging tool 31 which follows the tracks of the work vehicle may be different (e.g., lower than) than the disengaged position of certain ground engaging tools 31 that are not disposed behind the wheels of the work vehicle. In other words, the stored target positions for track following row units 18 may be different than a stored target position for non-track following row units 18. The controller 82 may store the extension length 100 (e.g., in the memory device 86) of each actuator 20 corresponding to the disengaged position of the respective ground engaging tool 31. Accordingly, the vertical distance between the lower surface 88 of the blade 28 and the surface 58 of the soil 60 may be substantially equal for all ground engaging tools 31 when the ground engaging tools 31 are in the disengaged position.

In some embodiments, the seeding implement control system 80 may use a combination of active control features and the calibration process set forth above to maintain the target position indicative of the disengaged position of certain ground engaging tools 31. For example, the seeding implement control system 80 may be calibrated to set the disengaged position of each ground engaging tool 31 and the controller 82 may monitor the position of each ground engaging tool 31 during operation of the seeding implement. The controller may adjust the actuators 20 of certain ground engaging tools 31 based on feedback from the sensor 92 if it is determined that a measured distance between the lower surface 88 of the blade 28 deviates from the target distance of the disengaged position.

For example, parameters of the soil 60 (e.g., density, moisture) may change while the work vehicle tows the seeding implement across the soil 60 (e.g., through different portions of a field). A depth of the track generated by the work vehicle may thus change. For example, a depth of the tracks may increase when a moisture level of the soil increases. In certain embodiments, the seeding implement control system 80 may adjust the disengaged position of the ground engaging tools 31 during agricultural operations (e.g., based on feedback from the sensor 92 and/or 98), such that a target vertical distance between the lower surface 88 of the blade 28 and the surface 58 of the soil 60 is substantially maintained.

Figure 5:
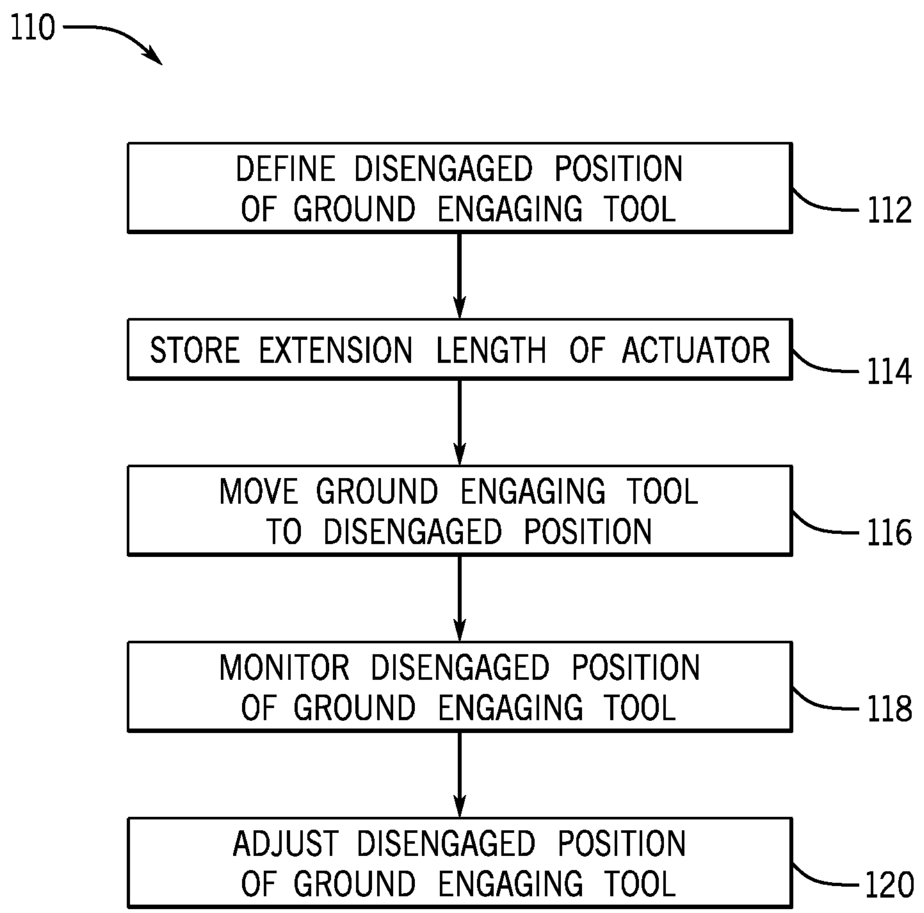
FIG. 5 is a flow diagram of a method of operating a seeding implement control system, in accordance with an embodiment of the present disclosure.

FIG. 5 is a flow diagram of an embodiment of a method 110 of operating a seeding implement control system, in accordance with an embodiment of the present disclosure. As discussed above, the seeding implement control system may be calibrated before beginning agricultural operations. In some embodiments, the operator may define (block 112) the disengaged position of the ground engaging tool(s) of the seeding implement. For example, the target position of the blade relative to the surface of the soil may be substantially zero when the ground engaging tool is in the disengaged position. In such embodiments, the operator may manually adjust the actuator such that the target distance between the lower surface of the blade and the surface of the soil is substantially zero (e.g., ±1 centimeters, ±0.5 centimeters). In other embodiments, the target distance between the lower surface of the blade and the surface of the soil may be substantially large while the ground engaging tool is in the resting position. For example, the operator may manually set the target distance to be 2 centimeters, 5 centimeters, 10 centimeters, or more.

In some embodiments, a sensor (e.g., a position sensor) may be used to define the disengaged position of the ground engaging tool. For example, the operator may instruct the controller to position the blade of the ground engaging tool at a certain target position above the surface of the soil. The controller may measure the vertical distance between the blade and the surface of the soil using the sensor. Accordingly, the controller may adjust the vertical position of the blade using the actuator, such the blade is positioned at the target position indicated by the operator.

In some embodiments, the disengaged position certain ground engaging tools of the seeding implement may be different than others. As discussed above, the ground engaging tools of certain row units may be disposed behind wheels of the work vehicle. The weight of the work vehicle may cause the wheel to compress the soil beneath the wheels, thus leaving indentations (e.g., tracks) in the surface of the soil. Accordingly, the disengaged position of the ground engaging tools disposed along the tracks may be lower than the disengaged position of ground engaging tools that are not disposed along the tracks. For example, in an embodiment where the target position of the ground engaging tool is substantially small, the disengaged position of ground engaging tools within the tracks may be lower relative to the disengaged position of ground engaging tools that are not disposed within the tracks.

In any case, the extension length of the actuator corresponding to disengaged position of the ground engaging tool may be stored (block 114) in the controller (e.g., in the memory device). In some embodiments, the actuator may include the internal sensor, which may send a signal to the controller indicative of the extension length of the actuator. In other embodiments, the extension length of the actuator may be measured and recorded using the external sensor disposed on a portion (e.g., the packer support structure) of the seeding implement. The calibration process may be completed individually for each ground engaging tool of the seeding implement. In some embodiments, the calibration process may be completed for all ground engaging tools at once.

The seeding implement may begin agricultural operations after the disengaged position of each ground engaging tool is determined. The controller may move (block 116) certain ground engaging tools to the stored disengaged position while the seeing implement traverses the field. As discussed above, the operator may instruct (e.g., via the input device) the controller to move certain ground engaging tools to the disengaged position. For example, the operator may move the ground engaging tools to the disengaged position when turning around the work vehicle in the headland of a field to complete a successive seeding path. In some embodiments, the controller may automatically move certain ground engaging tools to the disengaged position without input from the operator. For example, the field plan may indicate that the ground engaging tools should be disposed in the engaged position (e.g., depositing seed) in certain portions of the field and that the ground engaging tools should be disposed in the disengaged position (e.g., not depositing seed) in other portions of the field. In any case, the controller may instruct the actuator to move the ground engaging tool(s) between the engaged position and the disengaged position.

In some embodiments, the controller may be configured to monitor (block 118) the disengaged position of certain ground engaging tools. In some embodiments, a vertical distance between the surface of the soil and the lower surface of the blade may deviate from the target distance of the disengaged position during operation of the seeding implement. For example, parameters of the soil (e.g., density, moisture) may change while the work vehicle traverses certain portions of the field. In some cases, a depth of the track generated by the work vehicle may change (e.g., the depth may increase when the soil moisture increases). Accordingly, a vertical distance between the lower surface of the blade and the surface of the soil may deviate from the target distance. The controller may measure the vertical distance using the position sensor. In some embodiments, the controller may compare a deviation between the measured vertical distance and the target distance, and adjust (block 120) the disengaged position of the certain ground engaging tools when the deviation exceeds a threshold value. As such, the controller may ensure that the target position associated with the disengaged position of each ground engaging tool is maintained during operation of the seeding implement.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A seeding implement, comprising:

a controller, wherein the controller comprises a memory device and a processor; and an actuator, wherein the actuator is configured to move a blade of a ground engaging tool relative to a soil surface;

wherein the controller is configured to control the actuator to move the blade to a disengaged position in which a lower surface of the blade is positioned at a target distance above the soil surface, receive a first signal indicative of a target extension length of the actuator while the blade is in the disengaged position in which the lower surface of the blade is positioned at the target distance above the soil surface, store the target extension length in the memory device of the controller, wherein the target extension length corresponds to an extension length of the actuator at which the actuator positions the lower surface of the blade at the target distance above the soil surface, and control the actuator to transition to the target extension length in response to receipt of a second signal indicative of an input to transition the ground engaging tool to the disengaged position;

wherein the seeding implement comprises a second actuator, wherein the second actuator is configured to move a second blade of a second ground engaging tool relative to the soil surface, and the controller is configured to control the second actuator to move the second blade to a respective disengaged position in which a second lower surface of the second blade is positioned at the target distance above the soil surface while the second actuator is extended to a second target extension length that is different than the first target extension length, to store the second target extension length in the memory device of the controller, and to control the second actuator to transition to the second target extension length in response to receipt of a third signal indicative of another input to transition the second ground engaging tool to the respective disengaged position.

2. The seeding implement of claim 1, wherein the controller is configured to receive a fourth signal indicative of a measured distance between the lower surface of the blade and the soil surface.

3. The seeding implement of claim 2, wherein, in response to determining that a difference between the measured distance and the target distance is greater than a threshold distance while the actuator is extended to the target extension length, the controller is configured to control the actuator to adjust the extension length of the actuator to be different than the target extension length to adjust the measured distance.

4. The seeding implement of claim 2, comprising a proximity sensor that is configured to generate the fourth signal.

5. The seeding implement of claim 1, wherein the controller is configured to control the actuator to transition to a third target extension length in response to receipt of a fourth signal indicative of another input to transition the ground engaging tool to an engaged position.

6. The seeding implement of claim 5, wherein the fourth signal is generated by the controller based on a predetermined field map.

7. The seeding implement of claim 5, wherein the actuator is configured to position the lower surface of the blade at a second target distance below the soil surface while the actuator is extended to the third target extension length.

8. The seeding implement of claim 7, wherein the controller is configured to receive a fifth signal indicative of a second measured distance between the lower surface of the blade and the surface of the soil, and in response to determining that a difference between the second measured distance and the second target distance is greater than a threshold distance, the controller is configured to control the actuator to adjust the extension length of the actuator to be different than the third target extension length to adjust the second measured distance.

* * * * *